United States Patent [19]

Hetz

[11] 4,265,268
[45] May 5, 1981

[54] MODULATING FLOW CONTROL VALVE ASSEMBLY

[75] Inventor: Heinz K. Hetz, Holicong, Pa.
[73] Assignee: Yarway Corporation, Blue Bell, Pa.
[21] Appl. No.: 117,389
[22] Filed: Feb. 1, 1980
[51] Int. Cl.³ .............................................. G05D 7/01
[52] U.S. Cl. .................................... 137/117; 137/499; 417/299
[58] Field of Search ................. 137/98, 115, 116, 117, 137/499; 417/299

[56] References Cited

U.S. PATENT DOCUMENTS

| 113,829 | 4/1871 | Allen | 137/117 |
| 606,053 | 6/1898 | Dehnel | 137/117 |
| 1,280,477 | 10/1918 | Hopkins | 417/299 |

FOREIGN PATENT DOCUMENTS 1228919  4/1971  United Kingdom ..................... 417/299

Primary Examiner—Robert G. Nilson
Attorney, Agent, or Firm—John W. Logan, Jr.

[57] ABSTRACT

A modulating flow control valve assembly having a bypass extending from the face of the valve through the valve and the means by which the valve is mounted within the valve body. As the valve moves within the valve body in response to fluid demands, the amount of bypass fluid is varied accordingly by controlling the amount of fluid permitted to pass through the bypass.

15 Claims, 2 Drawing Figures

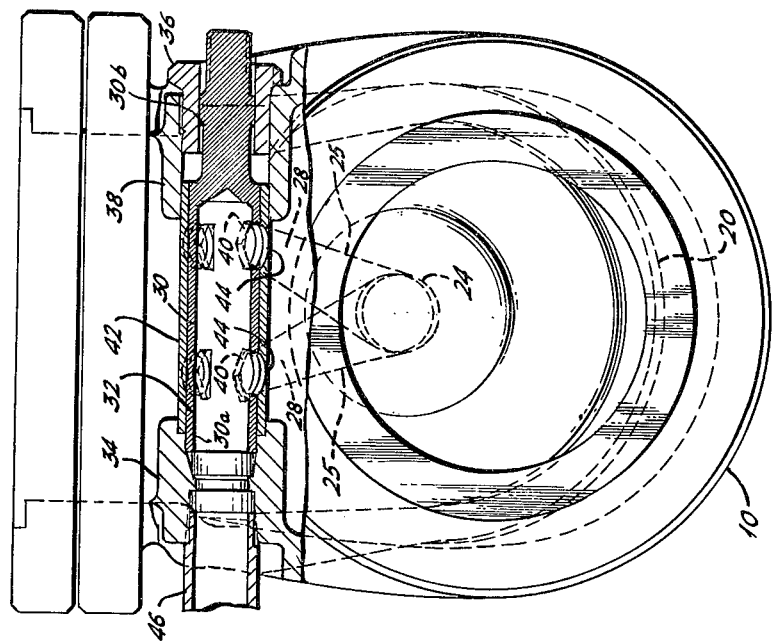
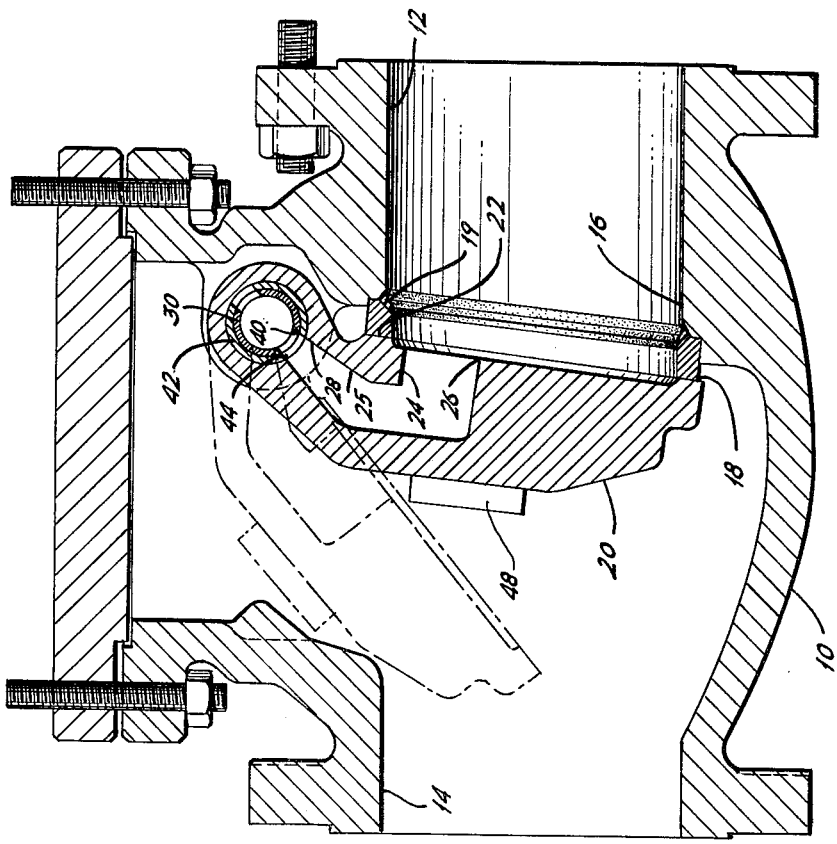

MODULATING FLOW CONTROL VALVE ASSEMBLY

DESCRIPTION

TECHNICAL FIELD

The present invention relates, in general, to flow control assemblies and, in particular, to a modulating flow control valve assembly having a bypass valve arranged to maintain a predetermined minimum input flow.

BACKGROUND ART

Various fluid systems include a pressure fluid supply which is to be divided between two output systems in accordance with flow changes in one of the output systems. For example, steam generating plants generally include a centrifugal feed water pump which provides an output flow to a feed water heater. In these plants, it is usual to operate the pump continuously and to utilize a check valve whose position is responsive to the rate of flow from the pump to the heater in accordance with the demand flow requirements of the heater. Flow through the pump also functions to cool the pump. Therefore, during periods of relatively low demand from the heater, when the output of the pump would fall below a minimum flow rate, it is possible for the pump to overheat. In order to protect against the pump overheating when the demand from the heater falls below the minimum flow rate, it is common practice to maintain the output of the pump at the minimum flow rate and recirculate the excess flow back to the pump. By recirculating a portion of the output, the pump is protected from overheating.

Recirculation of the output from the pump can be effected a number of ways. One is by manual operation of a bypass valve. This, however, is relatively expensive and unreliable. Another approach is to employ a bypass valve controlled by a flow meter which detects when the flow on the inlet side of the pump drops below the minimum rate required to cool the pump. When this condition is sensed, the flow meter causes the bypass valve to be opened maintaining the pump output and diverting that portion of the flow not required by the feed water to a sump connected to the inlet of the pump. Such an arrangement involves relatively complex and expensive apparatus and has not been found to be satisfactory.

Yet another approach to recirculating the output from the pump involves the use of a modulating flow control valve assembly including a main check valve whose position is responsive to the rate of flow from the pump to the heater and a bypass valve for recirculating flow back through the pump during periods of low demand by the heater. An example of this type of valve assembly is shown in U.S. Pat. No. 4,019,527. While modulating flow control valve assemblies have been found to be generally satisfactory for most systems, those that are known at the present time are not entirely satisfactory in certain applications which have the concurrent requirements of effective operation with minimum pressure drop, relatively simple construction, low cost, and easy adjustment, especially in the field, of the bypass starting position and capacity.

DISCLOSURE OF THE INVENTION

Accordingly, it is an objective of the present invention to provide a new and improved modulating flow control valve assembly.

It is another objective of the present invention to provide a modulating flow control valve assembly which operates effectively with minimum pressure drop, is relatively simple in construction, may be fabricated at low cost, and permits easy adjustment, especially in the field, of the bypass starting position and capacity.

These and other objectives are achieved by a modulating flow control valve assembly constructed in accordance with the present invention. Such an assembly includes a valve body having an inlet, an outlet, a main fluid passage extending from the inlet to the outlet, and a valve seat formed in the main fluid passage. Also included is a valve member having a face shaped and sized to cooperate with the valve seat and a bypass fluid passage extending from an inlet in the face of the valve member to an outlet. The invention further includes mounting means for mounting the valve member within the valve body for pivotal movement about an axis transverse to the main fluid passage to move the face of the valve member into and out of contact with the valve seat. The mounting means include a discharge passage having an inlet which selectively communicates with the outlet of the bypass passage from a maximum when the face of the valve member is in contact with the valve seat to a minimum when the face member is spaced from the valve seat a predetermined distance.

BRIEF DESCRIPTION OF DRAWING

Referring to the drawing:

FIG. 1 is a longitudinal sectional view of a valve assembly constructed in accordance with the present invention; and FIG. 2 is an end view partially broken away, of the FIG. 1 valve assembly.

BEST MODE OF CARRYING OUT THE INVENTION

Referring to the drawing, a modulating flow control valve assembly constructed in accordance with the present invention includes a valve body 10 having an inlet 12, an outlet 14, a main fluid passage 16 extending from inlet 12 to outlet 14, and a valve seat 18 formed in the main fluid passage. Valve seat 18 is formed by a metallic ring 19 fitted within and welded to the wall defining main fluid passage 16. Inlet 12 and outlet 14, may be connected, by suitable means, respectively, to a pressure source, such as a continuously operating feed water pump, and a demand system, such as a feedwater heater.

The valve assembly of the invention also includes a valve member 20 having a face 22 shaped and sized to cooperate with valve seat 18 and a bypass fluid passage 24 extending from an inlet 26 in the valve face to an outlet 28. For the embodiment of the invention illustrated, bypass fluid passage 24 is divided into a pair of passages 25 each leading to a separate outlet 28. Valve member 20 is arranged for movement within main fluid passage 16 to regulate fluid flow though this fluid passage. In particular, valve member 20 moves between the positions shown in solid and dotted lines.

The invention further includes mounting means for mounting valve member 20 within valve body 10 for pivotal movement about an axis transverse to main fluid passage 16 to move valve face 22 into and out of contact with valve seat 18 as shown by the solid and dotted lines, respectively. Such mounting means include, for the embodiment of the invention illustrated, a first tube 30 forming a discharge passage 32. Tube 30 is secured to valve body 10 by means of threaded couplings at its ends 30a and 30b. End 30a is in threaded engagement with an internally threaded boss 34, while end 30b is in threaded engagement with a jam nut 36 fitted within a boss 38. As rotation is imparted to tube 30 at end 30b, either by an external drive or a broach at this end, the tube is moved along its longitudinal axis relative to valve body 10.

Discharge passage 32 of tube 30 has an inlet in the form of two openings 40 which extend radially through the wall of the tube and communicate with outlets 28 by bypass fluid passage 24. In particular, the mounting means also include a tubular sleeve 42 formed as a part of valve member 20 and mounted on the tube 30 for pivotal movement about tube 30. Outlets 28 of bypass fluid passage 24 open into openings 44 in sleeve 42 which extend radially through the wall of sleeve 42.

Openings 44 in sleeve 42 move into and out of registration with openings 40 in tube 30 as valve member 20 pivots about tube 30. As a result, discharge passage 32 selectively communicates with bypass fluid passage 24 through outlets 28 of passages 25, openings 44 in sleeve 42, and openings 40 in tube 30. The degree of communication between bypass fluid passage 24 and discharge passage 32 varies from a maximum with valve face 22 in contact with valve seat 18 (solid line position of valve member 20) to a minimum with the valve face spaced from the valve seat a predetermined distance (dotted line position of valve member 20).

The outlet of discharge passage 32 is at end 30a of the tube 30. A pipe 46, also fitted within boss 34, communicates with discharge passage 32 to recirculate fluid passing through the discharge passage to the pressure source.

Coupled to valve member 20 are means for urging valve face 22 into contact with valve seat 18. Various approaches may be taken to achieve this result. A weight 48, secured to valve member 20 represents one way of biasing the valve member so that face 22 of the valve member normally seats against ring 19.

In operation, when the demand system requires delivery of fluid, the pressure of the fluid supplied from the pressure source causes valve member 20 to rotate about tube 30 to an open position with valve face 22 spaced of the valve seat 18, whereby fluid entering main fluid passage 16 through inlet 12 passes through to outlet 14. The degree of pressure differential between the pressure source and the demand system determines the particular position of valve member 20 within fluid passage 16. A portion of the fluid entering through inlet 12 may pass into bypass fluid passage 24 in valve member 20 depending upon the relative positions of openings 40 in tube 30. With valve member 22 at any position between the one shown in dotted lines and the one shown in solid lines, fluid entering bypass fluid passage 24 passes into discharge passage 32 for recirculation to the pressure source. With valve member 22 at the position shown in dotted lines, all of the fluid leaves through outlet 14 and none of the fluid passes into discharge passage 32 because the openings in tube 30 and sleeve 42 are not in registration. With valve member 22 at the position shown in solid lines, none of the fluid leaves through outlet 14 and all of the fluid passes through discharge passage 32.

The bypass starting position and capacity is easily adjusted by rotation of tube 30. Rotation of tube 30 in either direction causes translatory and rotary movement of tube 30 relative to sleeve 42 of valve member 20. Translatory movement of tube 30, with valve member 20 in the solid line position, determines the degree of overlap of the openings in sleeve 42 and tube 30 and, accordingly, the capacity of the bypass. The relative rotational positions of sleeve 42 and tube 30 determine the dotted line position of valve member 20 at which a portion of the fluid entering through inlet 12 will pass through bypass fluid passage 24 and discharge passage 32 for recirculation to the pressure source.

While in the foregoing there has been described a preferred embodiment of the invention, it should be understood to those skilled in the art that various modifications and changes can be made without departing from the true spirit and scope of the invention as recited in the claims.

I claim:

1. A modulating flow control valve assembly comprising:
    a valve body having an inlet, an outlet, a main fluid passage extending from said inlet to said outlet, and a valve seat formed in said main fluid passage;
    a valve member having a face shaped and sized to cooperate with said valve seat and a bypass fluid passage extending from an inlet in said face to an outlet; and, mounting means for mounting said valve member within said valve body for pivotal movement about an axis transverse to said fluid passage to move said face of said valve member into and out of contact with said valve seat, said mounting means including a discharge passage having an inlet which selectively communicates with said outlet of said bypass fluid passage from a maximum when said face of said valve member is in contact with said valve seat to a minimum when said face member is spaced from said valve seat a predetermined distance.

2. A modulating flow control valve according to claim 1 wherein said mounting means includes a first tube forming said discharge passage and secured to said valve body with its longitudinal axis transverse to said main fluid passage and a second tube secured to said valve member and mounted on said tube for pivotal movement about said first tube.

3. A modulating flow control valve according to claim 2 wherein said inlet of said discharge passage is an opening which extends radially through the wall of said first tube and communicates with said outlet of said bypass fluid passage through an opening which extends radially through the wall of said second tube.

4. A modulating flow control valve assembly comprising:
    a valve body having an inlet, an outlet, a fluid passage extending from said inlet to said outlet, and a valve seat formed in said fluid passage;
    a first tube mounted within said valve body transverse to said fluid passage and having an inlet opening extending radially through the wall thereof and an outlet opening;
    a second tube mounted on said first tube and having an opening extending radially through the wall thereof which is movable into and out of registration with said inlet opening of said first tube upon relative rotational movements of said tubes; and, a valve member secured to said second tube for movement within said fluid passage to cooperate with said valve seat and regulate fluid flow through said fluid passage, said valve member having a face disposed generally toward said inlet of said valve body and a bypass fluid passage extending from said face to said opening in said second tube.

5. A modulating flow control valve assembly according to claim 4 wherein said outlet opening of said first tube is at an end of said first tube.

6. A modulating flow control valve assembly according to claim 4 wherein said first tube has two inlet openings extending radially through the wall thereof, said second tube has multiple openings extending radially through the wall thereof which are movable into and out of registration with said inlet openings of said first tube, and said bypass fluid passage is in fluid communication with said openings in said second tube.

7. A modulating flow control valve assembly comprising:

a valve body having a main inlet, a main outlet, a main fluid passage extending from said main inlet to said main outlet, and a valve seat formed in said main fluid passage; a tubular member secured within said valve body with its longitudinal axis transverse to said main fluid passage and forming a discharge passage extending from an inlet to an outlet;

a valve member having (1) a face disposed generally toward said main inlet shaped and sized to cooperate with said valve seat, (2) a sleeve surrounding said tubular member for mounting said valve member on said tubular member for pivotal movement about said axis, and (3) a bypass fluid passage extending from an inlet in said face to an opening through said sleeve, said opening movable into and out of registration with said inlet of said discharge passage upon relative rotational movements of said sleeve and said tubular member; and, means coupled to said valve member for urging said face of said valve member into contact with said valve seat.

8. A modulating flow control valve according to claim 7 wherein said inlet to said discharge passage is an opening extending radially through the wall of said tubular member and said opening in said sleeve extends radially through the wall of said sleeve.

9. A modulating flow control valve according to claim 8 wherein said outlet from said discharge passage is an opening at an end of said tubular member.

10. A modulating flow control valve according to claim 9 wherein said tubular member and said sleeve each have multiple openings movable into and out of registration.

11. A modulating flow control valve assembly according to claim 8 wherein said valve body and said tubular member are secured together in threaded engagement along said longitudinal axis of said tubular member.

12. A modulating flow control valve assembly according to claim 2 wherein said valve body and said first tube are secured together in threaded engagement along said longitudinal axis.

13. A modulating flow control valve assembly according to claim 6 wherein said bypass fluid passage divides into multiple passages each leading to one of said openings in said second tube.

14. A modulating flow control valve assembly according to claim 7 wherein said tubular member has two inlets and said sleeve has multiple openings movable into and out of registration with said inlets of said tubular member.

15. A modulating flow control valve assembly according to claim 14 wherein said bypass fluid passage divides into multiple passages each leading to one of said openings in said sleeve.

* * * * *